United States Patent [19]

Nakase

[11] Patent Number: 4,761,593
[45] Date of Patent: Aug. 2, 1988

[54] DEVICE FOR CONTROLLING MOTOR DRIVEN ANTENNAS FOR VEHICLES

[75] Inventor: Kazuhiko Nakase, Tokyo, Japan

[73] Assignee: Harada Kogyo Kabushiki Kaisha, Tokyo, Japan

[21] Appl. No.: 32,784

[22] Filed: Mar. 31, 1987

[30] Foreign Application Priority Data

Apr. 22, 1986 [JP] Japan .................................. 61-93001

[51] Int. Cl.$^4$ ............................................. H02P 3/08
[52] U.S. Cl. .................................................. 318/473
[58] Field of Search ............... 318/264, 265, 266, 267, 318/286, 291, 293, 471, 472, 473; 361/23, 27

[56] References Cited

U.S. PATENT DOCUMENTS

| 4,220,900 | 9/1980 | Mintz | 318/266 |
| 4,272,708 | 6/1981 | Carle et al. | 318/286 X |
| 4,394,605 | 7/1983 | Terazawa | 318/291 X |
| 4,514,670 | 4/1985 | Fassel et al. | 318/467 |
| 4,672,278 | 6/1987 | Ingraham et al. | 318/283 |

FOREIGN PATENT DOCUMENTS 3145248   5/1983   Fed. Rep. of Germany ...... 318/471

*Primary Examiner*—Bentsu Ro
*Attorney, Agent, or Firm*—Koda and Androlia

[57] ABSTRACT

A controlling device for an automobile motor driven antenna including a motor for extending and retracting an antenna by the power from a battery, and a control circuit for controlling the power. The control circuit includes a current detector for detecting the power flowing into and out of the motor and a current breaker which breaks the current when it is over a predesignated level so that a pair of relay contacts in the circuit changes the direction of the current so that the motor may make a forward or reverse rotation for extending or retracting the antenna and automatically make a stop of such rotation.

3 Claims, 3 Drawing Sheets

DEVICE FOR CONTROLLING MOTOR DRIVEN ANTENNAS FOR VEHICLES

BACKGROUND OF THE INVENTION

1. Field of the Invention

This invention relates to a control device for motor driven antennas used in vehicles.

2. Prior Art

In the conventional control device for motor driven antennas, the antenna position is mechanically calculated by an antenna drive system which is linked with gears to the antenna, and the control device controls the position of the antenna with the thus obtained values. For example, when the motor revolves 100 times, the device recognizes that the antenna has been extended 1 m, for instance. Further, the conventional device uses a limit switch system so that when the antenna is fully extended or retracted, the switch mechanically functions to open and close the motor circuit.

However, since the conventional device positions (extends and retracts) the antenna by using gears, in other words, the positioning of the antenna is made mechanically, it is not easy to position the antenna accurately. Further, in order to reduce the mechanical stress, the conventional device uses a mechanical clutch. Thus, since the conventional device uses mechanical limit switches and mechanical clutches, the overall structure tends to be complicated.

In addition to the above, since the conventional device contains mechanically abrasive portions, the reliability of the motor antenna is low, and it is very difficult to design a device small.

SUMMARY OF THE INVENTION

The present invention is made in view of the problems of the conventional device, and it is a primary object of this invention to provide a control device for a motor driven antenna for vehicles which has a simple structure and a high motor antenna reliability and is easily designed to be small in size.

In keeping with the principles of this invention, the above objects are accomplished by a unique structure for an antenna control device for vehicles which includes an antenna, a motor for extending and retracting the antenna, a control circuit which controls the starting and stopping of the motor, an ignition key, and a radio wave receiver. The control circuit includes an electric current detection means or positive characteristic thermistors connected in series to the motor for detecting an electric current flowing into the motor; and the circuit further includes an electrical current breaking means for breaking the current to the motor when the current exceeds a predesignated level so that the motor extends or retracts the antenna when the ignition key is turned on and/or the radio wave receiver is switched on and off.

BRIEF DESCRIPTION OF THE DRAWINGS

The above-mentioned features and objects of the present invention will become more apparent with reference to the following description taken in conjunction with the accompanying drawings wherein like reference numerals denote like elements, and in which.

DETAILED DESCRIPTION OF THE INVENTION

Figure 2:
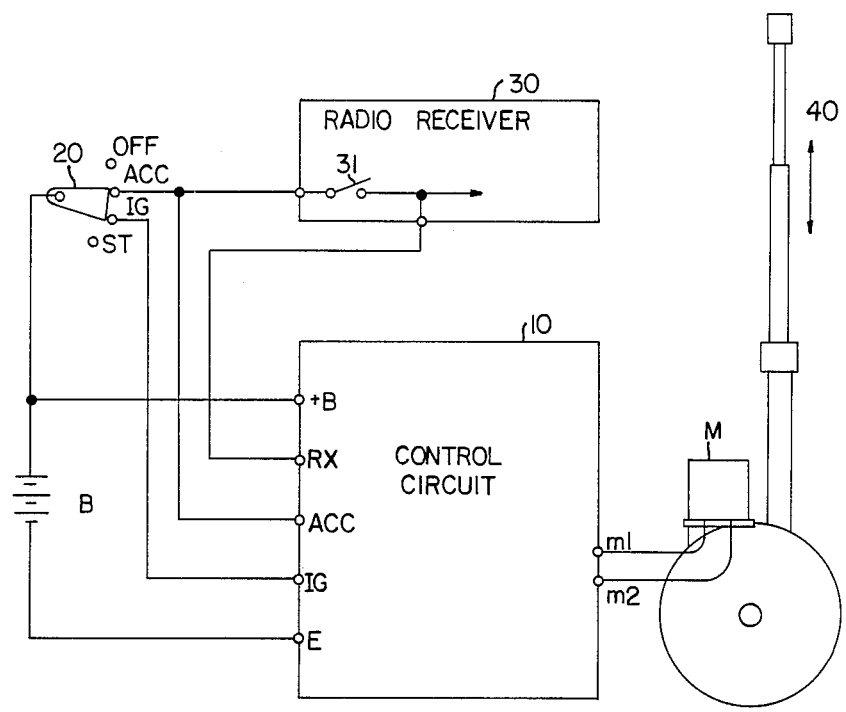
FIG. 2 is a system diagram of the motor antenna control in which the embodiment of FIG. 1 is employed.

Referring now to FIG. 2 which illustrates a control system for the motor antenna of the present invention. The control system includes a battery B, a control circuit 10, an ignition key 20, a radio receiver 30, a motor M, and an antenna 40.

The control circuit 10 controls the starting of the motor M and detects electric current and branch current of the motor M. Based upon the result thus detected, the control circuit 10 stops the motor M. The control circuit 10 includes a +B terminal and an RX terminal which receives a +B voltage through a power switch 31 of the radio receiver 30. The control circuit 10 further includes an ACC terminal, an IG terminal, and a ground terminal E.

Figure 1:
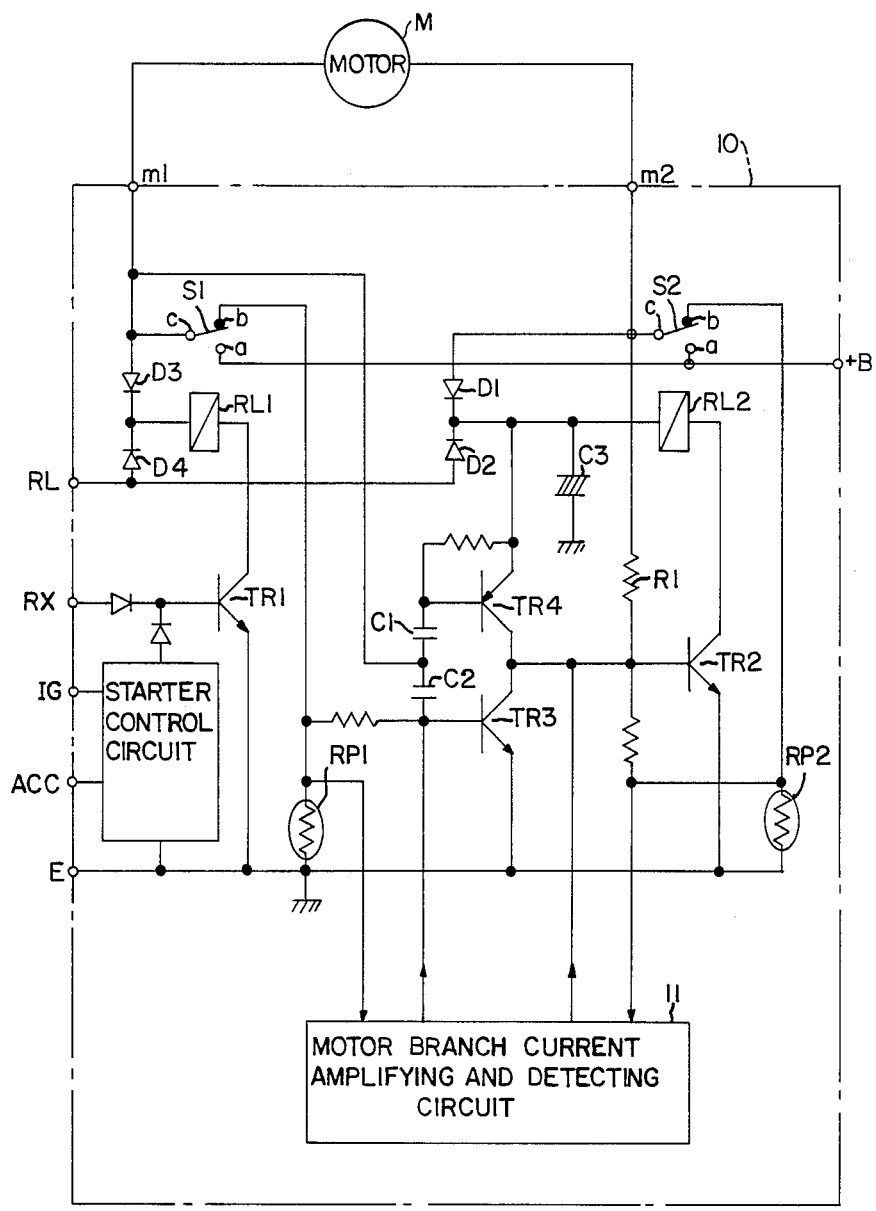
FIG. 1 is a circuit diagram representing one embodiment of the present invention.

FIG. 1 is a circuit diagram showing the control circuit shown in FIG. 2 in a more detail manner.

The circuit of FIG. 1 includes a relay RL1 which changes over and controls a relay contact S1, a relay RL2 which changes over and controls a relay contact S2, a transistor TR1 which controls the relay RL1, and a transistor TR2 which controls the relay RL2.

The transistor TR1 is turned on when the ignition key 20 and the power switch 31 of the radio receiver 30 are turned on. The transistor TR1 excites the relay RL1 by way of the power from the RL terminal which is connected to the RX terminal or the ACC terminal; and when the relay RL1 is excited, the relay contact S1 is changed over from the point b to the point a. The relay RL2 is excited when the transistor TR2 is turned on; and when the relay RL2 is excited, the relay contact S2 is changed over from the point b to the point a.

A positive line from the battery B is connected to the point a of the relay contact S1 and the point a of the relay contact S2. One terminal m1 of the motor M is connected to point c of the relay contact S1, and the other terminal m2 of the motor M is connected to point c of the relay contact S2.

A positive characteristic thermistor RP1, which possesses a positive resistance-temperature characteristics, is interposed between the point b of the relay contact S1 and the ground. Another positive characteristic thermistor RP2 is interposed between the point b of the relay contact S2 and the ground. The relay contacts S1 and S2 are respectively changed over to the point b when the relays RL1 and RL2 are not excited.

Diodes D1, D2, D3, and D4 are electric current blocking diodes, and these diodes control the current for exciting the relays which is supplied from the +B power source or the RL power source so that the relay exciting current does not flow into the other power sources. Condenser C3 is provided in the circuit so that it supplies a power to the relay RL2 for a short period of time when the supply of the RL power is stopped. The electric current from the condenser C3 is blocked by the diodes D1 and D2 and flows only to the relay RL2.

The transistor TR3 starts to function when the voltage at both ends of the positive characteristic thermistor RP1 is higher than a predetermined level. The positive pulses, which are generated at the moment the relay RL1 is excited and the contact S1 is changed over from the point b to the point a, passes through the condenser C2, and with this positive pulse the transistor TR3 is turned on and the transistor TR2 turns off. On the other hand, the negative pulses, which are generated at the moment the contact S1 is changed over from the point a to the point b, passes through the condenser C1, and with this negative pulses the transistor TR4 is turned on and the transistor TR2 is turned off.

A motor branch current amplifying and detecting circuit 11 includes an alternating current amplifier and a rectification circuit, and this circuit 11 amplifies the branch current generated at the both ends of the positive characteristic thermistor RP1 or RP2 and outputs a negative voltage element. The negative signals thus outputed are fed to the base of the transistor TR2 and also to the base of the transistor TR3.

The operation of the above embodiment will be explained in the below.

Figure 3:
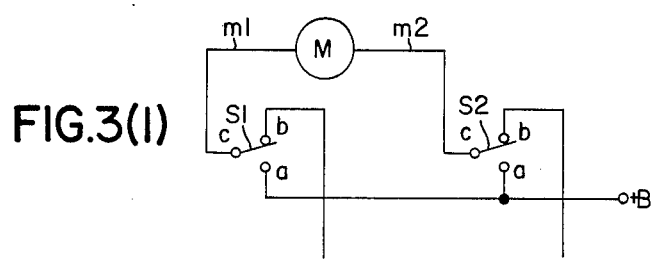
FIGS. 3 (1) through 3 (4) are illustrations showing the connections of relays in the above embodiment.
Figure 3:
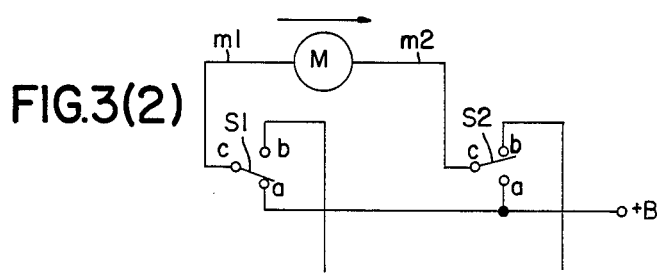
Figure 3:
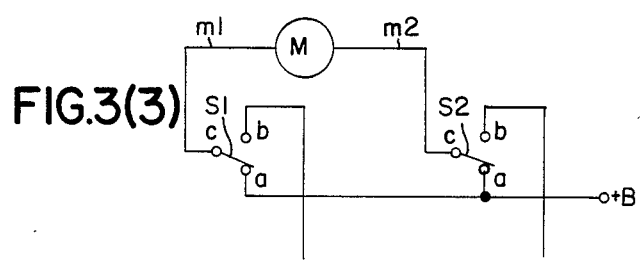
Figure 3:
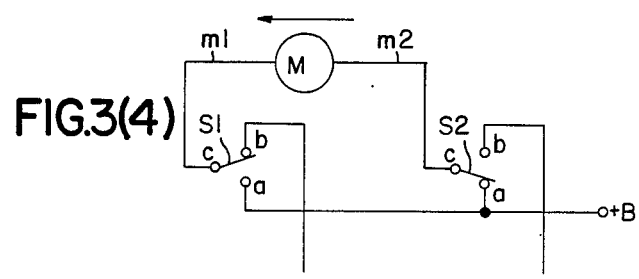

First, when the antenna 40 is retracted and the ignition key 20 is not turned on, the voltage at the RL terminal is zero, and therefore, neither the relay S1 nor S2 are excited. Thus, the relay contacts S1 and S2 are connected to the points b, respectively, and no current flows to the motor M. Accordingly, the antenna 40 stays retracted. This is shown in FIG. 3 (1).

When the ignition key 20 is turned on and the switch 31 of the radio receiver 30 is switched on, the +B voltage is applied to the RX terminal. Then, the transistor TR1 is turned on, and the relay RL1 is excited through the RL terminal and the diode D4. As a result, the relay contact S1 is changed over from the point b to the point a, and an electric current flows to the motor M through the +B terminal, the relay contact S1, the terminals m1 and m2, the relay contact S2, and the positive characteristic thermistor RP2. Thus, the antenna 40 is extended. This is shown in FIG. 3 (2).

When the antenna is fully extended, it is mechanically locked and an excess current flow through the motor M. Thus, the voltage at the both ends of the positive characteristic thermistor RP2 is increased, and the transistor TR2 is turned on, and as a result the relay RL2 is excited. Accordingly, the relay contact S2 is changed over from the point b to the point a, and the current flowing to the motor M is stopped. As a result, the extension of the antenna 40 is stopped. This is shown in FIG. 3 (3).

In this case, the relay contact S2 has been changed over to the point a, and a base current flows to the transistor TR2 through the points a and c of the relay contact S2 and the resistance R1; therefore, the relay RL2 is self-held. On the other hand, since the transistor TR1 stays turned on as long as the power switch 31 stays on, the relay RL1 is also kept excited, and as a result the relay RL1 is self-held. In other words, if the power switch 31 is on when the antenna has been fully extended, the antenna stays in the fully extended position.

Then, when the power switch 31 is turned off, the transistor TR1 is turned off and the relay RL1 turns off, and the relay contact S1 is changed over to the point b. As a result, as shown in FIG. 3 (4), since the current flows in the direction from the terminal m2 to the terminal m1 of the motor M, the motor M reverses its direction of rotation, and the antenna 40 is retracted.

When the antenna 40 is completely retracted, it is mechanically locked. Then, the electric current in the motor M becomes very large, and the terminal voltage of the positive characteristic thermistor RP1 is increased. As a result, the transistor TR3 is turned on and drops the base electric potential of the transistor TR2. The transistor TR2 is turned off, the relay RL2 is turned off, and the relay contact S2 is changed over to the point b. Thus, the current flowing in the motor M is stopped, in other words, the antenna 40 is retracted. This is shown in FIG. 3 (1).

The circuits for the condensers C1 and C2 eliminate the malfunction, which is caused by a rush electric current which occurs when the motor M is started, as a timer. Thus, with the condensers C1 and C2, the motor M, which works to extend and retract the antenna, receives the signal which is opposite to the signal being received.

As mentioned above, the antenna 40 is fully extended and then locked, and this control is brought by applying the changes (increase) in the terminal voltage of the positive characteristics to the base of the transistor TR2, and by exciting the relay RL2 when the terminal voltage is increased over the predetermined level.

On the other hand, the control to retract and then lock the antenna is brought by applying the changes (increase) in the terminal voltage of the positive characteristic thermistor RP1 to the base of the transistor TR3, turning on the transistor TR3 when the terminal voltage becomes higher than the predetermined level, turning off the transistor TR2, and then turning off the relay RL2.

Further, when the motor antenna 40 is locked, the terminal voltage in the positive characteristic thermistors RP2 and RP1 is immediately increased. Thus, it is possible to design a system such that only the increased amount of the voltage is applied to the base of each transistor. With this arrangement, the chances for the antenna to be influenced by the steady-state current is less likely, and the antenna is extended and retracted without failure.

In the above embodiment, when the motor M is running, the branch current generated by the commutator is picked up by the positive characteristic thermistors RP1 and RP2 and detected and amplified by the motor branch current amplifying and detecting circuit 11. As a result, a negative direct current is generated, and this negative direct current is applied to the bases of the transistors TR2 and TR3.

Thus, when the motor M is running, it does not receive the direct current elements of the positive characteristic thermistors RP1 and RP2. As a result, the functional errors caused by the changes in the load on the motor M which is derived from the deformation of the antenna 40 can be prevented. Further, the functional errors caused by the increase in the motor current, which is generated when the load at the motor driving section is increased in the low ambient temperature, can be also prevented.

Since the above embodiment uses positive characteristic thermistors RP1 and RP2, the control errors can be prevented. The possible control errors and the solution thereof will be explained below.

Figure 4:
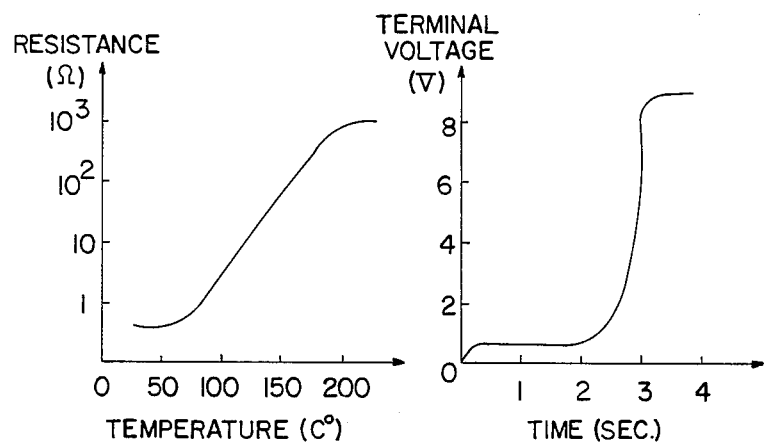
FIG. 4 shows graphs representing characteristics of a positive thermistor.

The functional errors could occur in the mechanical system, and the motor M could stop with an excessive current which flows into the motor M. In this case, the excess current also flows into the positive characteristic thermistors RP1 and RP2 which are connected in series to the motor M. If the excess current flows into the motor M for a few minutes, heat is generated in the positive characteristics thermistor RP1 or RP2, and as shown in FIG. 4, the resistance level increases and the motor current can be restricted. Further, since the terminal voltage at the positive characteristics thermistor RP1 or RP2 increases sharply, the transistors TR2 and TR1 function smoothly. Thus, control errors can be prevented.

When the control cannot be resumed smoothly due to the malfunction in the control circuit, etc., it is impossible to block the motor current. However, since the current can be restricted by the positive characteristic thermistors, the motor M is prevented from burning out.

Instead of the positive characteristic thermistors RP1 and RP2, a fixed resistance may be used in the present invention.

In case that the ignition key 20 is turned off when the switch 31 of the radio receiver 30 is left on (and the antenna 40 is left extended), it is necessary to retract the antenna. To retract the antenna, in the conventional device, the power for the control circuit is directly taken from the battery B so that the control circuit is kept connected to the power source. As a result, a battery discharge caused by a dark current in the control circuit occurs occasionally, and also the semiconductor malfunctions when struck by the lightning. However, in the embodiment of the present invention, the power from the battery is used until the antenna is retracted, and once the antenna is retracted completely, the power supply from the battery is stopped. In order to smoothly accomplish such a power supply control, the control power source maintaining circuit (which comprises the two diodes D1 and D2 and the large capacity condenser C3) is employed.

More specifically, when the ignition key 20 is turned off while the antenna 40 is being retracted, the relay RL2 is being excited at this moment and the +B power from the battery B is supplied to the relay RL2 and the control circuit through the diode D1 so that the antenna 40 is kept retracting. When the antenna is completely retracted, the relay RL2 and the control circuit are disconnected from the +B power.

On the other hand, when the ignition key 20 is turned off while the antenna is being extended by the electrical charge of the condenser C3, although at this moment the relay RL2 is not being excited, the control circuit and the relay RL2 are instantly rendered to function. In other words, the contact S1 is changed over from the point a to the point b; therefore, at this moment, the transistor TR4 is begun to be turned on by the condenser C1, and the transistor TR4 successively begins to turn on, and then the relay RL2 momentarily functions. As a result, the contact S2 of the relay RL2 is changed over to the point a, and the +B power is supplied to the relay RL2 and the control circuit through the diode D1 until the antenna 40 is completely retracted. The above embodiment can be automatically controlled electronically without using mechanical limit switches, mechanical clutches, etc.

As mentioned in detail in the above, according to the present invention, the control device for motor driven antenna for automobiles has a simple structure and a high motor antenna reliability, and is easy to design the overall size small.

I claim:

1. A control device for a motor driven antenna for vehicles comprising:
    an electric current detecting means for detecting current in a motor which extends and retracts said antenna, said electric current detecting means comprising positive characteristic thermistors which are connected in series to said motor; and
    an electric current breaking means responsive to said positive characteristic thermistors for breaking said current in said motor when the current increases over a predetermined level.

2. A control device for a motor driven antenna for vehicles comprising:
    an electric current detecting means for detecting electric current in a motor which extends and retracts said antenna, said electric current detecting means comprising positive characteristic thermistors which are connected in series to said motor;
    a branch current detecting means for detecting the branch current of at least a branch element in said motor; and
    an electric current breaking means for breaking said motor current in response to the value of said motor current in said electric current detecting means and the value of said branch current obtained by said branch current detecting means.

3. A control device according to claim 2 including a plurality of branch elements, wherein said electric current breaking means detects the branch current of only a branch element having an opposite polarity to said motor current, rectifies the thus detected branch current and then adds the rectified branch current to said motor current, whereby when said added value is over a predetermined level, said motor current is interrupted.

* * * * *